United States Patent

Duttera et al.

[15] 3,643,061
[45] Feb. 15, 1972

[54] TUBULAR COMPOSITE SELF-SHIELDED ARC WELDING ELECTRODES

[72] Inventors: Robert B. Duttera, Springfield Township, York County; Gordon H. Macshane, Upper St. Clair Township, Allegheny County, both of Pa.

[73] Assignee: Teledyne, Inc., Los Angeles, Calif.

[22] Filed: June 8, 1970

[21] Appl. No.: 44,561

[52] U.S. Cl. ............................................ 219/146, 117/202
[51] Int. Cl. .......................................................... B23k 35/22
[58] Field of Search ................ 219/145, 146; 117/202, 203, 117/204, 205, 206; 148/24, 26

[56] References Cited

UNITED STATES PATENTS 3,466,417   9/1969   Chapman et al. ................... 219/146 X Primary Examiner—J. V. Truhe
Assistant Examiner—George A. Montanye
Attorney—Edward Hoopes, III

[57] ABSTRACT

A tubular composite self-shielded arc welding electrode comprising a metallic outer sheath and a core within and enclosed by the sheath, the core comprising about 15 percent to about 60 percent of the electrode weight and consisting essentially of the following listed components in the specified weight percentages of the electrode: from about 1 percent to about 7 percent of at least one slag former, from about 0.5 percent to about 6 percent of at least one fluxing agent, up to about 3.2 percent of at least one arc stabilizer selected from the group consisting of calcium titanate, potassium titanate, potassium-bearing frit, sodium titanate and sodium-bearing frit, from 1.25 percent to about 4 percent of deoxidizer metal including at least 1 percent manganese and at least 0.25 percent silicon, and from about 12 percent to about 55 percent of other metal-bearing materials selected from the group consisting of metals, metal alloys and ferroalloys, the electrode being formulated to produce a high-alloy deposit of a type selected from austenitic chromium-nickel stainless steels and nickel-base alloys. In a preferred form the electrode may contain up to about 3 percent by weight of at least one fissure-reducing agent selected from the group consisting of alloyed and unalloyed metallic forms of calcium, magnesium and titanium.

16 Claims, No Drawings

TUBULAR COMPOSITE SELF-SHIELDED ARC WELDING ELECTRODES

This invention relates to arc welding electrodes of the bare continuous tubular composite type, in which a metal sheath encloses a core of suitable materials. More particularly, it relates to such electrodes capable of producing high-alloy weld deposits of the austenitic chromium-nickel stainless steel and nickel-base alloy types without the need for any external arc shielding means. Electrodes of this type are commonly referred to as "self-shielded" or "gasless" electrodes.

Self-shielded tubular composite electrodes have developed for semiautomatic and automatic hardsurfacing and mild and low-alloy steel joining applications. These electrodes are popular not only because they provide commercially acceptable weld metal possessing the desired properties for the applications in which they are used but also because they require neither the use of shielding gas and complex equipment to release and direct the gas nor the use of granular flux and associated equipment for covering the weld area with the flux and for recovering excess flux.

In view of the attractive features of self-shielded electrodes for hard surfacing and mild or low-alloy steel joining applications, there is a demand for such electrodes for depositing other types of weld metal, most importantly high-alloy weld metal of the austenitic chromium-nickel stainless steel and nickel-base alloy types.

Efforts to apply the various core compositions used in self-shielded mild steel, low-alloy steel and hard surfacing tubular electrodes to self-shielded electrodes for stainless steel and nickel-base alloys have not met with success for several reasons. Welding operation with electrodes using these core compositions for stainless steel and nickel-base alloys is characterized by high spatter; the slag produced with the electrodes is difficult to remove; the contour of the deposited weld is generally poor as compared to that produced with gas-shielded metal arc welding electrodes of the same alloy type; and with certain types, notably the nickel-base alloys and Type 310 stainless steel, the welds often exhibit fissures on cooling.

We have discovered that the use of certain novel combinations of core ingredients in tubular composite self-shielded electrodes for producing high-alloy deposits of the austenitic chromium-nickel stainless steel and nickel-base alloy types eliminates the above-mentioned difficulties.

We provide a tubular composite self-shielded arc welding electrode comprising a metallic outer sheath and a core within and enclosed by the sheath, the core comprising about 15 percent to about 60 percent of the electrode weight and consisting essentially of the following listed components in the specified weight percentages of the electrode: from about 1 percent to about 7 percent of at least one slag former, from about 0.5 percent to about 6 percent of at least one fluxing agent, up to about 3.2 percent of at least one arc stabilizer selected from the group consisting of calcium titanate, potassium titanate, potassium-bearing frit, sodium titanate and sodium-bearing frit, from 1.25 percent to about 4 percent of deoxidizer metal including at least 1 percent manganese and at least 0.25 percent silicon and from about 12 percent to about 55 percent of other metal-bearing materials selected from the group consisting of metals, metal alloys and ferroalloys, the electrode being formulated to produce a high-alloy deposit of a type selected from austenitic chromium-nickel stainless steels and nickel-base alloys. In a preferred form the electrode may contain up to about 3 percent by weight of at least one fissure-reducing agent selected from the group consisting of alloyed and unalloyed metallic forms of calcium, magnesium and titanium.

By electrode slag formers is meant materials which add bulk to the welding slag; such materials generally constitute the major portion of the ingredients forming the slag, and thus also influence bead appearance and contour. Examples of slag formers include rutile, zircon sand, wollastonite, sodium feldspar, potassium feldspar, magnesium silicate, anhydrous potassium silicate and chromium oxide. Electrode fluxing agents are materials which regulate the slag fluidity and thereby affect slag coverage and removal; in addition, these materials may serve to remove inclusions from the weld metal. Examples of fluxing agents include cryolite, fluorspar, potassium silicofluoride, sodium silicofluoride, lithium fluoride, magnesium fluoride and sodium fluoride. Electrode arc stabilizers reduce spatter and irregularities in the transfer of molten metal across the welding arc; examples are the potassium-bearing frit described hereinbelow, potassium titanate, calcium titanate, sodium titanate and sodium-bearing frits. It should be noted that cited examples of the various components may serve in more than one capacity in some welding systems; the examples are listed in the categories in which they are generally felt to operate most frequently. For example, potassium silicofluoride is listed as an example of a fluxing agent, but in electrodes of our invention this material acts both as a fluxing agent and as an arc stabilizer.

Electrode deoxidizer metals reduce the oxygen and in some cases also the nitrogen contents of the weld metal by combining with these elements to form oxides and nitrides which go primarily into the slag. Common deoxidizer metals are silicon, manganese, and aluminum, and we have found that for acceptable results our tubular electrodes must include a content of at least 1.0 percent manganese and at least 0.25 percent silicon. Titanium, magnesium and calcium are also deoxidizer metals which have the added property of acting as fissure reducing agents as is later discussed.

As is known to those skilled in the art, after deoxidation has been accomplished further additions of deoxidizers dissolve in the weld metal and begin to act as alloying metal. For example, in our electrodes manganese up to about 2 percent acts as a deoxidizer and in amounts over this becomes alloying metal. The actual proportions of each deoxidizer metal oxidized or retained as alloy are dependent on factors such as the total amounts and relative strengths of all deoxidizers present in the arc environment. Where limits are given herein for the amount of deoxidizer metals in the core of our tubular electrode, it will be appreciated that the tubular electrode may contain manganese and/or silicon in amounts greater than the stated maximum deoxidizer amount, the excess functioning as alloying metal.

We further provide a tubular composite self-shielded arc welding electrode comprising a metallic outer sheath and a core within and enclosed by the sheath, the core comprising about 20 percent to about 50 percent of the electrode weight and consisting essentially of the following listed components in the specified weight percentages of the electrode: from about 2 percent to about 5.5 percent of slag former comprising rutile, from about 0.5 percent to about 1.8 percent of fluxing agent comprising cryolite, from about 0.5 percent to about 1.5 percent of arc stabilizer comprising calcium titanate, from about 0.3 percent to about 1.5 percent of at least one arc stabilizer selected from the group consisting of potassium-bearing frit and potassium titanate, from 1.25 percent to about 3.5 percent of deoxidizer metal including at least 1 percent manganese and at least 0.25 percent silicon and from about 15 percent to about 45 percent of other metal-bearing materials selected from the group consisting of metals, metal alloys and ferroalloys, the electrode being formulated to produce a high-alloy deposit of a type selected from austenitic chromium-nickel stainless steels and nickel-base alloys. In a preferred form the electrode may contain up to about 1.5 percent by weight of at least one fissure-reducing agent selected from the group consisting of alloyed and unalloyed metallic forms of calcium, magnesium and titanium. This electrode produces a rutile-base slag.

We further provide a tubular composite self-shielded arc welding electrode comprising a metallic outer sheath and a core within and enclosed by the sheath, the core comprising about 20 percent to about 50 percent of the electrode weight and consisting essentially of the following listed components in the specified weight percentages of the electrode: from about 1 percent to about 5 percent of at least one slag former selected from the group consisting of rutile, wollastonite and anhydrous potassium silicate, from about 1.5 percent to about 5 percent of fluxing agent comprising calcium fluoride, up to about 2 percent of fluxing agent selected from the group consisting of potassium silicofluoride and sodium silicofluoride, up to about 1 percent of at least one arc stabilizer selected from the group consisting of potassium-bearing frit and potassium titanate, from 1.25 percent to about 3.5 percent of deoxidizer metal including at least 1 percent manganese and at least 0.25 percent silicon and from about 15 percent to about 45 percent of other metal-bearing materials selected from the group consisting of metals, metal alloys and ferroalloys, the electrode being formulated to produce a high-alloy deposit of a type selected from austenitic chromium-nickel stainless steels and nickel-base alloys. In a preferred form the electrode may contain up to about 1.5 percent by weight of at least one fissure-reducing agent selected from the group consisting of alloyed and unalloyed metallic forms of calcium, magnesium and titanium. This electrode produces a fluoride-base slag.

As described hereinafter, we provide our preferred electrodes for depositing specific types of weld metal.

In this specification and the claims following, all percentages are by weight of the electrode.

Our preferred electrodes are of two types, rutile-base and fluoride-base, classified according to the slags they produce. A rutile-base slag provides slightly better horizontal fillet weld metal contour than a fluoride-base slag and the latter provides somewhat better weld metal mechanical properties than the former.

Fabrication of our improved tubular composite electrodes may be accomplished by any of several commonly known methods. The object of any such method is to enclose a core of chosen materials, generally in finely divided form, in a suitable metal sheath in such a way that none of the core material can be lost and the incursion of air to moisture into the core is minimized or prevented. Selection of core materials, in addition to being based on the desired slag system, operational characteristics and weld deposit chemistry, takes into account objectives such as low moisture content and rehydration rate and similar aims recognized by those skilled in the art. Sheath metal is selected primarily on the basis of its formability and its contribution to overall electrode chemistry; good formability is necessary in order to fabricate the tube and the sheath normally contributes the major portion of the electrode chemistry. For economy in fabrication, our new electrodes preferably employ a mild steel sheath enclosing a core containing metal-bearing powdered alloy materials. When this arrangement does not provide sufficient alloy content, e.g., for nickel-base alloy electrodes, the sheath may be made of alloy steel or of alloying metal such as essentially pure nickel.

For producing austenitic chromium-nickel stainless steel deposits we provide a tubular composite self-shielded arc welding electrode of either the rutile-base or fluoride-base type which contains, in addition to the nonmetallic ingredients, from about 0.3 percent to about 1.3 percent silicon, from 1 percent to about 3 percent manganese, from about 17 percent to about 30 percent chromium, from about 8 percent to about 23 percent nickel, up to about 0.2 percent carbon, balance essentially iron.

For producing columbium-stabilized austenitic chromium-nickel stainless steel deposits we provide a tubular composite self-shielded arc welding electrode of either the rutile-base or fluoride-base type which contains, in addition to the nonmetallic ingredients, from about 0.3 percent to about 1.3 percent silicon, from 1 percent to about 3 percent manganese, from about 18 percent to about 25 percent chromium, from about 8 percent to about 15 percent nickel, up to about 0.12 percent carbon, from about 0.2 percent to about 1.2 percent columbium, balance essentially iron.

For producing molybdenum-fortified austenitic chromium-nickel stainless steel deposits we provide a tubular composite self-shielded arc welding electrode of either the rutile-base or fluoride-base type which contains, in addition to the nonmetallic ingredients, from about 0.3 percent to about 1.3 percent silicon, from 1 percent to about 3 percent manganese, from about 15 percent to about 25 percent chromium, from about 8 percent to about 15 percent nickel, up to about 0.2 percent carbon, from about 0.5 percent to about 4 percent molybdenum, balance essentially iron.

For producing nickel-base deposits we provide a tubular composite self-shielded arc welding electrode of either the rutile-base or fluoride-base type which contains, in addition to the nonmetallic ingredients, from about 0.3 percent to about 1.3 percent silicon, from about 1.5 percent to about 4.5 percent manganese, from about 13 percent to about 28 percent chromium, from about 60 percent to about 80 percent nickel, from about 0.2 percent to about 4 percent columbium, up to about 5 percent iron and up to about 0.2 percent carbon. In a preferred form this electrode also contains up to about 1.5 percent of at least one fissure-reducing agent selected from the group consisting of alloyed and unalloyed metallic forms of calcium, magnesium, and titanium.

The metallic contents of our electrodes are normally obtained both from the sheath material, as above indicated, and from common powdered metals and alloys, e.g., ferrosilicon and electrolytic manganese, added to the core. As is known to those skilled in the art, other core materials may be used to aid in securing the necessary metallic contents of the electrodes; for example, it is possible for a powdered metal-bearing material to appear in the electrode core in a nonmetallic form such as an oxide if the form is readily reducible under welding conditions and accompanied by a corresponding amount of reducing agent such as silicon. Since the chromium-nickel and nickel-base deposits produced by our electrodes require a carbon content of less than 0.20 percent and in some cases (low carbon grades) less than 0.03 percent, sources of carbon in the electrode, especially in the metallic components, must be controlled. Normally such carbon as is present is an unavoidable residual element in the sheath material and/or one or more of the powdered alloys in the core, although when tolerable less expensive ferro alloys or sheath metal containing somewhat greater than residual amounts of carbon may be used for reasons of economy.

Our new electrodes are characterized by globular metal transfer with comparatively low spatter levels, easily removed slag, smooth bead contour, good tie-in of weld metal to base material and decreased weld-metal fissuring in the fissure-prone types when our above described fissure-reducing agents are used.

As is apparent from the information set forth hereinabove, we have found that one or more of the metals calcium, magnesium and titanium, when present in the electrode either alloyed or unalloyed in total amount less than about 3 percent of the electrode weight, significantly reduce the fissuring tendency in alloys which normally show such tendency, e.g., nickel-base alloys such as those classified by the American Welding Society as NiCr3. The reasons for this beneficial effect are not clear, but it is our present belief that these metals reduce sulfides and other harmful inclusions in the weld metal and help overcome the generally harmful effects of nitrogen and oxygen on the deposit.

As is well known in the art, a source of potassium ions assists in stabilizing the welding arc. To be useful in our electrodes, such source must provide potassium ions in a form which does not also add components with adverse effects on rehydration properties of the core or on welding operation. We have found that potassium titanate is a suitable material for this use, as is potassium-bearing frit; a frit which we have used successfully has the following listed typical composition by weight: 18 percent manganese oxides; 16 percent silicon dioxide; 41 percent titanium dioxide; 25 percent potassium oxide. We may also use potassium silicofluoride, which both provides potassium ions and acts as a fluxing agent, and/or anhydrous potassium silicate, which provides potassium ions and acts as a slag former.

Other details, objects and advantages of the invention will become apparent as the following description of certain present preferred embodiments thereof proceeds.

EXAMPLE 1

A fluoride-base tubular composite electrode for depositing Type 308L weld metal was fabricated utilizing low-carbon mild steel strip as the sheath; the core of the electrode comprised 40 percent by weight of the electrode and was composed of the following listed granular ingredients in the stated percentages by weight of the electrode: rutile 1.6 percent; wollastonite 0.8 percent; calcium fluoride (as fluorspar) 4.2 percent; potassium silicofluoride 0.4 percent; electrolytic manganese metal 2.0 percent; silicon (added as 50 percent ferrosilicon) 0.4 percent; chromium metal 20.6 percent; nickel 9.6 percent; iron 0.4 percent. All core materials were sized to minus 30 U.S. mesh before being included in the core mixture. The electrode was drawn to seven sixty-fourths inches diameter and used to prepare an undiluted weld metal specimen by semiautomatic welding at 350–400 amperes and 25–27 volts DC reverse polarity. Operation, slag removal and bead contour with this electrode and the other examples herein were all satisfactory i.e., as above described. The undiluted weld metal had the following listed composition: carbon 0.019 percent; manganese 1.51 percent; silicon 0.30 percent; chromium 22.25 percent; nickel 10.18 percent; balance essentially iron.

EXAMPLE 2

A fluoride-base tubular composite electrode for depositing Type 309L weld metal was fabricated in a manner similar to that used in Example 1. The sheath was low-carbon mild steel strip and in this example the core constituted 44.5 percent of the electrode weight and was composed of the following listed ingredients in the stated percentages of the electrode weight: rutile 0.9 percent; wollastonite 0.6 percent; calcium fluoride (as fluorspar) 3.3 percent; potassium silicofluoride 0.4 percent; electrolytic manganese metal 1.7 percent; silicon (added as 50% FeSi) 0.5 percent; chromium metal 23.8 percent; nickel 12.5 percent; iron 0.8 percent. An indiluted weld metal specimen prepared with the seven sixty-fourths inch diameter finished electrode analyzed as follows: carbon 0.019 percent; manganese 1.37 percent; silicon 0.34 percent; chromium 24.88 percent, nickel 12.99 percent; balance essentially iron.

EXAMPLE 3

A rutile-base electrode for depositing Type 309L weld metal was fabricated using low-carbon mild steel strip as the sheath enclosing a core which constituted 44.5 percent of the electrode weight. By weight of the electrode, the core contained 3 percent rutile; 1 percent cryolite; 1 percent calcium titanate; 0.5 percent of the above described potassium-bearing frit; 1.7 percent electrolytic manganese metal; 0.5 percent silicon (added as 50% FeSi); 23.8 percent chromium metal; 12.5 percent nickel; 0.5 percent iron. The undiluted weld metal from this electrode was of substantially the same analysis as that from the electrode of Example 2.

EXAMPLE 4

The core for a fluoride-base electrode for depositing Type 316L weld metal comprised 42 percent of the electrode weight and contained, by weight of the electrode, 1.2 percent rutile; 0.6 percent wollastonite; 3.2 percent calcium fluoride (as fluorspar); 0.4 percent potassium silicofluoride; 1.6 percent electrolytic manganese metal; 0.4 percent silicon (added as 50% FeSi); 19 percent chromium metal; 11.4 percent nickel; 2.1 percent molybdenum (added as 60 percent ferromolybdenum); 2.1 percent iron. Low carbon mild steel strip was used for the sheath. Analysis of the undiluted weld metal deposited with the electrode was 0.018 percent carbon; 1.26 percent manganese; 0.33 percent silicon; 19.54 percent chromium; 12.34 percent nickel; 2.10 percent molybdenum; balance essentially iron.

EXAMPLE 5

For depositing Type 347 weld metal, a fluoride-base tubular composite self-shielded electrode was fabricated using mild steel strip as the sheath enclosing a core which was 41 percent of the electrode weight. By weight of the electrode, the core contained 1.6 percent rutile; 0.8 percent wollastonite; 4.1 percent calcium fluoride (as fluorspar); 0.4 percent potassium silicofluoride; 2.1 percent electrolytic manganese metal; 0.4 percent silicon (added as 50% FeSi); 20.5 percent chromium metal; 9.4 percent nickel; 0.8 percent columbium (added as 65 percent ferrocolumbium); 0.9 percent iron. The deposit produced with this electrode contained 0.038 percent carbon; 1.60 percent manganese; 0.38 percent silicon; 21.52 percent chromium; 9.63 percent nickel; 0.58 percent columbium; balance essentially iron.

EXAMPLE 6

To demonstrate the effect of our above discussed fissure-reducing agents on the fissuring tendency of weld metal of AWS type NiCr3 deposited with our new fluoride-base electrodes, two such electrodes, one with fissure-reducing agents in the core and one without, were fabricated using nickel strip for the sheath and a core constituting 33 percent of the electrode weight in each case. A comparison of the core compositions, wherein electrode (a) was devoid of fissure-reducing agents and electrode (b) contained said agents, is as shown in Table 1 below:

TABLE 1

| Core Material | % By Weight of Electrode Electrode (a) | Electrode (b) |
|---|---|---|
| Rutile | 1.7 | 1.7 |
| Wollastonite | 0.8 | — |
| Calcium Fluoride (as Fluorspar) | 3.3 | 3.3 |
| Potassium Silicofluoride | 0.3 | 0.3 |
| Potassium-bearing frit described above | 0.3 | 0.3 |
| Electrolytic Manganese Metal (deoxidizer) | 2.0 | 2.0 |
| Electrolytic Manganese Metal (alloy metal) | 1.1 | 1.1 |
| Silicon (added as 50% FeSi) | 0.3 | — |
| Silicon (added as 32% Ca-60% Si alloy) | — | 0.3 |
| Chromium Metal | 17.0 | 17.0 |
| Chromium (added as 5.1% C, 67% Cr ferrochromium) | 0.7 | 0.7 |
| Nickel | 1.5 | 2.0 |
| Columbium (added as 65% ferrocolumbium) | 2.3 | 2.3 |
| Magnesium Metal | — | 0.3 |
| Calcium (added as 32% Ca-60% Si alloy) | — | 0.2 |
| Carbon (from FeCr) | <0.1 | <0.1 |
| Iron | 1.6 | 1.4 |

Except for the removal of wollastonite and ferrosilicon from electrode (b) to balance the core when the fissure reducing agents were added, the core compositions of the two electrodes were identical. Undiluted weld metal deposited with the electrodes had a typical analysis of 0.093 percent carbon; 3.3 percent manganese; b 0.31 percent silicon; 17.3 percent chromium; 2.2 percent columbium; 0.10 percent titanium; 1.2 percent iron; balance essentially nickel. To check fissuring tendency of the weld metal each electrode was drawn to seven sixty-fourths inch diameter and used to prepare a two-layer deposit by semiautomatic welding on ½ inches×2 inches×9 inches mild steel base plate; the deposit consisted of four stringer beads in each layer, and was approximately 8 inches long and 1 ½ inches wide. The top surface of each deposit was ground flat and the weldment was then bent 90° over a ¾ inches radius anvil located on the surface of the base plate opposite the deposit. After bending, the number of fissures in a 6-square-inch area of the deposit including the bend area was recorded. In this test weld metal from electrode (a), which contained no fissure reducing agents, showed 10 fissures while that from electrode (b), which contained fissure-reducing agents as disclosed hereinabove, showed only two fissures.

EXAMPLE 7

The effect of fissure-reducing agents on the fissuring tendency of AWS NiCr3 weld metal deposited with our new rutile-base electrodes was checked by preparing elecrodes (c) and (d), core compositions of which are shown in Table 2 below, using nickel sheath and a core weight equal to 33 percent of the electrode weight.

TABLE 2

| Core Material | % By Weight of Electrode Electrode (c) | Electrode (d) |
| --- | --- | --- |
| Rutile | 4.3 | 3.8 |
| Cryolite | 1.3 | 1.3 |
| Calcium Titanate | 1.3 | 1.3 |
| Potassium-bearing Frit | 1.0 | 1.0 |
| Silicon (added as 50% FeSi) | 0.4 | — |
| Silicon (added as 32% Ca-60% Si alloy) | — | 0.3 |
| Electrolytic Manganese Metal (deoxidizer) | 2.0 | 2.0 |
| Electrolytic Manganese Metal (alloy metal) | 1.1 | 1.1 |
| Chromium metal | 17.0 | 17.0 |
| Chromium (added as 5.1% C, 67% ferrochromium) | 0.7 | 0.7 |
| Columbium (added as 65% FeCb) | 2.3 | 2.3 |
| Magnesium Metal | — | 0.3 |
| Calcium (added as 32% Ca-60% Si alloy) | — | 0.2 |
| Titanium (added as 70% ferrotitanium) | — | 0.4 |
| Carbon (from FeCr) | <0.1 | <0.1 |
| Iron | 1.5 | 1.2 |

The small adjustments in the rutile and silicon contents of electrode (d) resulted from the need to balance the core of electrode (d) when the fissure-reducing agents were added. In this example ferrotitanium was used as a fissure-reducing agent in addition to the magnesium and calcium used in Example 6. The electrodes were drawn to seven sixty-fourths inch and used to prepare weldments as described in Example 6. Bending of the weldments, as described also in Example 6, produced over 100 fissures in the deposit from electrode (c) but less than 10 fissures in the deposit from electrode (d), to which the fissure-reducing agents were added.

Examples 6 and 7 show that our fissure-reducing agents are effective in both fluoride-base and rutile-base electrodes.

Our electrodes are useful over a wide range of semiautomatic and automatic welding conditions. For example, in addition to the normal conditions described hereinabove for Example 1, we have used the electrodes extensively in a method of dual electrode welding described in copending U.S. Pat. application Ser. No. 4,367, filed Jan. 20, 1970, which involves extremely high total arc current levels, on the order of 1,100 amps for seven sixty-fourths inch diameter electrodes.

While we have described certain present preferred embodiments of the invention, it is to be distinctly understood that the invention is not limited thereto but may be otherwise variously embodied within the scope of the following claims.

We claim:

1. A tubular composite self-sbielded arc welding electrode comprising a metallic outer sheath and a core within and enclosed by the sheath, the electrode containing chromium and nickel in sum in an amount equal to at least about 23 percent of the weight of the electrode whereby to produce a high-alloy deposit of a type selected from austenitic chromium-nickel stainless steels and nickel base alloys, the core comprising about 15 percent to about 60 percent of the electrode weight and consisting essentially of the following listed components in the specified weight percentages of the electrode: from about 1 percent to about 7 percent of at least one slag former, from about 0.5 percent to about 6 percent of at least one fluxing agent, up to about 3.2 percent of at least one arc stabilizer selected from the group consisting of calcium titanate, potassium titanate, potassium-bearing frit, sodium titanate and sodium-bearing frit, from 1.25 percent to about 4 percent deoxidizer metal including at least 1 percent manganese and at least 0.25 percent silicon, and from about 12 percent to about 55 percent of other metal-bearing materials selected from the group consisting of metals, metal alloys and ferroalloys.

2. A tubular composite self-shielded arc welding electrode as claimed in claim 1 containing up to about 3 percent of at least one fissure-reducing agent selected from the group consisting of alloyed and unalloyed metallic forms of calcium, magnesium and titanium.

3. A tubular composite self-shielded arc welding electrode comprising a metallic outer sheath and a core within and enclosed by the sheath, the electrode containing chromium and nickel in sum in an amount equal to at least about 23 percent of the weight of the electrode whereby to produce a high-alloy deposit of a type selected from austenitic chromium-nickel stainless steels and nickel base alloys, the core comprising about 20 percent to about 50 percent of the electrode weight and consisting essentially of the following listed components in the specified weight percentages of the electrode: from about 2 percent to about 5.5 percent of slag former comprising rutile, from about 0.5 percent to about 1.8 percent of fluxing agent comprising cryolite, from about 0.5 percent to about 1.5 percent of arc stabilizer comprising calcium titanate, from about 0.3 percent to about 1.5 percent of at least one arc stabilizer selected from the group consisting of potassium-bearing frit and potassium titanate, from 1.25 percent to about 3.5 percent of deoxidizer metal including at least 1 percent manganese and at least 0.25 percent silicon and from about 15 percent to about 45 percent of other metal-bearing materials selected from the group consisting of metals, metal alloys and ferroalloys.

4. A tubular composite self-shielded arc welding electrode as claimed in claim 3 containing up to about 1.5 percent of at least one fissure-reducing agent selected from the group consisting of alloyed and unalloyed metallic forms of calcium, magnesium and titanium.

5. A tubular composite self-shielded arc welding electrode as claimed in claim 3 which contains from about 0.3 percent to about 1.3 percent silicon, from 1 percent to about 3 percent manganese, from about 17 percent to about 30 percent chromium, from about 8 percent to about 23 percent nickel, up to about 0.2 percent carbon, balance essentially iron.

6. A tubular composite self-shielded arc welding electrode as claimed in claim 3 which contains from about 0.3 percent to about 1.3 percent silicon, from 1 percent to about 3 percent manganese, from about 18 percent to about 25 percent chromium, from about 8 percent to about 15 percent nickel, up to about 0.12 percent carbon, from about 0.2 percent to about 1.2 percent columbium, balance essentially iron.

7. A tubular composite self-shielded arc welding electrode as claimed in claim 3 which contains from about 0.3 percent to about 1.3 percent silicon, from 1 percent to about 3 percent manganese, from about 15 percent to about 25 percent chromium, from about 8 percent to about 15 percent nickel, up to about 0.2 percent carbon, from about 0.5 percent to about 4 percent molybdenum, balance essentially iron.

8. A tubular composite self-shielded arc welding electrode as claimed in claim 3 which contains from about 0.3 percent to about 1.3 percent silicon, from 1.5 percent to about 4.5 percent manganese, from about 13 percent to about 28 percent chromium, from about 60 percent to about 80 percent nickel, from about 0.2 percent to about 4 percent columbium, up to about 5 percent iron and up to about 0.2 percent carbon.

9. A tubular composite self-shielded arc welding electrode as claimed in claim 8 containing up to about 1.5 percent of at least one fissure-reducing agent selected from the group consisting of alloyed and unalloyed metallic forms of calcium, magnesium and titanium.

10. A tubular composite self-shielded arc welding electrode comprising a metallic outer sheath and a core within and enclosed by the sheath, the electrode containing chromium and nickel in sum in an amount equal to at least about 23 percent of the weight of the electrode whereby to produce a high-alloy deposit of a type selected from austenitic chromium-nickel stainless steels and nickel base alloys, the core comprising about 20 percent to about 50 percent of the electrode weight and consisting essentially of the following listed components in the specified weight percentages of the electrode: from about 1 percent to about 5 percent of at least one slag former selected from the group consisting of rutile, wollastonite and anhydrous potassium silicate, from about 1.5 percent to about 5 percent of fluxing agent comprising calcium fluoride, up to about 2 percent of fluxing agent selected from the group consisting of potassium silicofluoride and sodium silicofluoride, up to about 1 percent of at least one arc stabilizer selected from the group consisting of potassium-bearing frit and potassium titanate, from 1.25 percent to about 3.5 percent of deoxidizer metal including at least 1 manganese and at least 0.25 silicon, and from about 15 percent to about 45 percent of metal-bearing materials selected from the group consisting of metals, metal alloys and ferroalloys.

11. A tubular composite self-shielded arc welding electrode as claimed in claim 10 containing up to about 1.5 percent of at least one fissure-reducing agent selected from the group consisting of alloyed and unalloyed metallic forms of calcium, magnesium and titanium.

12. A tubular composite self-shielded arc welding electrode as claimed in claim 10 which contains from about 0.3 percent to about 1.3 percent silicon, from 1 percent to about 3 percent manganese, from about 17 percent to about 30 percent chromium, from about 8 percent to about 23 percent nickel, up to about 0.2 percent carbon, balance essentially iron.

13. A tubular composite self-shielded arc welding electrode as claimed in claim 10 which contains from about 0.3 percent to about 1.3 percent silicon, from 1 percent to about 3 percent manganese, from about 18 percent to about 25 percent chromium, from about 8 percent to about 15 percent nickel, up to about 0.12 percent carbon, from about 0.2 percent to about 1.2 percent columbium, balance essentially iron.

14. A tubular composite self-shielded arc welding electrode as claimed in claim 10 which contains from about 0.3 percent to about 1.3 percent silicon, from 1 percent to about 3 percent manganese, from about 15 percent to about 25 percent chromium, from about 8 percent to about 15 percent nickel, up to about 0.2 percent carbon, from about 0.5 percent to about 4 percent molybdenum, balance essentially iron.

15. A tubular composite self-shielded arc welding electrode as claimed in claim 10 which contains from about 0.3 percent to about 1.3 percent silicon, from about 1.5 percent to about 4.5 percent manganese, from about 13 percent to about 28 percent chromium, from about 60 percent to about 80 percent nickel, from about 0.2 percent to about 4 percent columbium, up to about 5 percent iron and up to about 0.2 percent carbon.

16. A tubular composite self-shielded arc welding electrode as claimed in claim 15 containing up to about 1.5 percent of at least one fissure-reducing agent selected from the group consisting of alloyed and unalloyed metallic forms of calcium, magnesium and titanium.

* * * * *

UNITED STATES PATENT OFFICE
CERTIFICATE OF CORRECTION

Patent No. 3,643,061          Dated February 15, 1972

Inventor(s) ROBERT B. DUTTERA and GORDON H. MACSHANE

It is certified that error appears in the above-identified patent and that said Letters Patent are hereby corrected as shown below:

Column 1, line 12, after "have" insert --been--. Column 3, line 37, change "the" to --that-- and change "to" to --or--. Column 6, line 58, cancel "b"; line 63, change "inches" (first occurrence) to --inch--; line 68, change "inches" to --inch--. Column 7, line 60 (claim 1, line 1), change "self-sbielded" to --self-shielded; line 72 (claim 1, line 16), after "4 percent" insert --of--. Column 9, line 15 (claim 10, line 20), after "1" insert --percent-- and after "0.25" insert --percent--.

Signed and sealed this 20th day of June 1972.

(SEAL)
Attest:

EDWARD M.FLETCHER,JR.                    ROBERT GOTTSCHALK
Attesting Officer                        Commissioner of Patents